(12) United States Patent
Harman (10) Patent No.: US 8,968,692 B2
(45) Date of Patent: Mar. 3, 2015

(54) REGENERABLE REMOVAL OF SULFUR FROM GASEOUS OR LIQUID MIXTURES

(75) Inventor: Gary E. Harman, Geneva, NY (US)

(73) Assignee: Cornell University, Ithaca, NY (US)

( * ) Notice: Subject to any disclaimer, the term of this patent is extended or adjusted under 35 U.S.C. 154(b) by 959 days.

(21) Appl. No.: 13/124,530

(22) PCT Filed: Oct. 16, 2009

(86) PCT No.: PCT/US2009/061014
§ 371 (c)(1),
(2), (4) Date: Nov. 18, 2011

(87) PCT Pub. No.: WO2010/045562
PCT Pub. Date: Apr. 22, 2010

(65) Prior Publication Data
US 2011/0197640 A1    Aug. 18, 2011

Related U.S. Application Data (60) Provisional application No. 61/106,081, filed on Oct. 16, 2008.

(51) Int. Cl.
| | | |
|---|---|---|
| *B01D 15/00* | (2006.01) | |
| *B01D 53/48* | (2006.01) | |
| *B01J 8/00* | (2006.01) | |
| *C05F 11/00* | (2006.01) | |
| *C09K 3/00* | (2006.01) | |
| *C02F 1/28* | (2006.01) | |
| *B01D 53/02* | (2006.01) | |
| *C05D 9/00* | (2006.01) | |
| *C02F 1/66* | (2006.01) | |
| *C02F 101/10* | (2006.01) | |

(52) U.S. Cl.
CPC ............... *C02F 1/288* (2013.01); *B01D 53/02* (2013.01); *C05D 9/00* (2013.01); *B01D 2251/60* (2013.01); *B01D 2253/112* (2013.01); *B01D 2257/304* (2013.01); *B01D 2257/306* (2013.01); *B01D 2257/308* (2013.01); *B01D 2258/05* (2013.01); *C02F 1/281* (2013.01); *C02F 1/286* (2013.01); *C02F 1/66* (2013.01); *C02F 2101/101* (2013.01); *Y02E 50/346* (2013.01)
USPC .............. 423/244.03; 423/244.06; 423/573.1; 71/11; 71/23; 422/177; 422/211; 252/184; 252/191; 210/660; 210/763

(58) Field of Classification Search
USPC ........... 71/11, 23; 423/244.03, 244.06, 573.1; 422/177, 211; 252/184, 191; 210/660, 210/763
See application file for complete search history.

(56) References Cited

U.S. PATENT DOCUMENTS

| | | |
|---|---|---|
| 4,406,872 A | 9/1983 | Kapner et al. |
| 4,670,288 A * | 6/1987 | Ikari et al. .................. 427/4 |
| 4,923,688 A | 5/1990 | Iannicelli |
| 5,948,269 A | 9/1999 | Stone |
| 6,500,237 B2 | 12/2002 | Winchester et al. |
| 6,544,492 B1 | 4/2003 | DeBerry |
| 6,551,570 B1 | 4/2003 | Smith et al. |
| 6,579,506 B2 | 6/2003 | Spink et al. |
| 6,743,405 B1 * | 6/2004 | Siriwardane ............. 423/244.06 |
| 7,004,996 B2 | 2/2006 | Ciccarelli |
| 7,427,383 B2 | 9/2008 | Cisneros |
| 7,563,424 B2 * | 7/2009 | Scranton et al. ......... 423/244.06 |
| 8,647,600 B2 * | 2/2014 | Liu et al. ..................... 423/632 |
| 2001/0050245 A1 | 12/2001 | Hearn et al. |
| 2002/0034468 A1 | 3/2002 | Spink et al. |
| 2002/0058587 A1 * | 5/2002 | Scranton et al. .............. 502/401 |
| 2003/0085174 A1 | 5/2003 | Zappi et al. |
| 2005/0035057 A1 | 2/2005 | Zikeli et al. |
| 2005/0098503 A1 | 5/2005 | Kim |
| 2006/0006121 A1 | 1/2006 | Simpson et al. |
| 2008/0085547 A1 | 4/2008 | Herner et al. |
| 2009/0200205 A1 | 8/2009 | Smith et al. |
| 2013/0126781 A1 * | 5/2013 | Boote et al. ................. 252/184 |
| 2013/0174622 A1 * | 7/2013 | Long ............................ 71/23 |
| 2014/0117282 A1 * | 5/2014 | Liu et al. .................. 252/191 |

FOREIGN PATENT DOCUMENTS

WO    2008/076928 A2    6/2008

OTHER PUBLICATIONS

International Search Report and Written Opinion issued in PCT/US2009/061014, mailed May 28, 2010.

Solvay Chemicals, Inc., "Controlling Reduced Sulfur Compounds with Interox® Hydrogen Peroxide," *Solvay Chemicals Technical Publication*, pp. 1-6 (2005).

* cited by examiner

*Primary Examiner* — Timothy Vanoy
(74) *Attorney, Agent, or Firm* — Heslin Rothenberg Farley & Mesiti P.C.; Andrew K. Gonsalves, Esq.

(57) ABSTRACT

The present invention relates to a method for removing sulfur from a gaseous or liquid mixture. This method involves contacting the gaseous or liquid mixture with an iron-enriched matrix under conditions effective to remove sulfur from the mixture through adsorption of the sulfur to the matrix. The iron-enriched matrix used in this method is a lignocellulosic material that is enriched with iron. The present invention also relates to a system, composition, and plant fertilizer that contain the iron-enriched matrix. Methods of making the composition and preparing a plant fertilizer are also disclosed.

56 Claims, 4 Drawing Sheets

REGENERABLE REMOVAL OF SULFUR FROM GASEOUS OR LIQUID MIXTURES

The present application is a U.S. National Phase filing under 35 U.S.C. § 371 of International Application No. PCT/US2009/061014, filed Oct. 16, 2009, and published as WO 2010/045562 on Apr. 22, 2010, which claims priority benefit of U.S. Provisional Patent Application Ser. No. 61/106,081, filed Oct. 16, 2008, the disclosures of which are hereby incorporated by reference in their entirety.

FIELD OF THE INVENTION

The present invention relates to the removal of sulfur from gaseous or liquid mixtures.

BACKGROUND OF THE INVENTION

Anaerobic fermentation of biological waste materials produces methane, together with carbon dioxide and, frequently, significant quantities of hydrogen sulfide ($H_2S$) plus traces of other volatile sulfur containing compounds. This anaerobic fermentation may occur in waste processing, such as sewage treatment and wastewater treatment plants or in sewers. It also can be produced in landfills and anaerobic fermenters used for biogas production. Landfills and anaerobic fermenters produce methane that may be used for bioenergy production. Typical compositions of gases from either landfills (composition varies markedly depending on the materials in the landfill) or from anaerobic fermentation of materials, such as farm manure, typically contain 40-60% methane ($CH_4$), similar levels of carbon dioxide ($CO_2$), some other gases such as carbon monoxide, and varying levels of $H_2S$, ranging from a low level to 10-30,000 ppm. The contamination of biogas with corrosive and toxic $H_2S$ limits its use. Use of gases that contain hydrogen sulfide at concentrations over 200 ppmv will void turbine manufacturers' warranties, and many municipalities or other governmental agencies limit the amount of $H_2S$ that can be present to as low as 3 ppmv. On-farm electrical energy from digester biogas occurs now with internal combustion engines; the corrosive characteristics are mitigated by frequent oil changes. However, combustion of the gas results in production of the air pollutant $SO_2$ at levels roughly equimolar to the amount of $H_2S$ in the input gas. Wide-scale use of any biogas will necessitate avoidance of release of sulfur compounds into the atmosphere.

Hydrogen sulfide is toxic, has an unpleasant smell, and is highly corrosive. Hydrogen sulfide gas is explosive when mixed with air at 4.5 to 45.5% (www.OSHA.gov). The $LD_{50}$ for inhalation (rat) is 444 ppm (physchem.ox.ac.uk/MSDS/HY/hydrogen_sulfide.html). Clearly, methods for economical removal of $H_2S$ from biogas are required if sulfur-containing biogases are to be used for large-scale energy production.

Hydrogen sulfide and other reduced sulfur compounds may be present at high concentrations in landfill gases that are produced from sites that contain high levels of construction and demolition debris. These compounds result from microbial activity on gypsum present in drywall, where the sulfates in the gypsum are reduced to hydrogen sulfide and other reduced volatile sulfur compounds (Lee, S., Q. Xu et al., "Reduced Sulfur Compounds in Gas from Construction and Demolition Debris Landfills," *Waste Manage.* 26:526-533 (2006)). Some sites operated have concentrations in landfill gases at levels of 10,000 ppmv $H_2S$ and 1200-1500 scfm gas flows. Other sites produce landfill gas containing 500-700 ppmv of $H_2S$ at 200-300 scfm. Thus, many landfill gas sites produce hydrogen sulfide at concentrations that are too high to allow for bioenergy production.

Anaerobic digesters used for on-farm manure disposal are an important underutilized resource for energy production, although use is increasing. Between 1991 and 2002 the number of units either planned or in operation has increased nationwide from about 20 to more than 80 (www.cogeneration.net/anaerobic_digesters.htm). However, in 1995, a study estimated that 3000 to 5000 systems could be economically installed in the USA (referenced in Zicari, S. M., "Removal of Hydrogen Sulfide from Biogas Using Cow-Manure Compost," *Animal Science*, Thesis, Cornell University, Ithaca, N.Y., 120 pages (2003)). Generally, at least 500 cows are required to create a sufficiently large level of biomass for economical biogas production. According to one estimate, if all of the dairy manure in New York State was anaerobically digested, the annual energy potential would be 280 GWh, which would support the energy demands of 47,000 households as well as providing all of the energy demands for the producing farms (Ma, J., "Spatial Analysis of the Potential for Dairy Manure as a Renewable Energy Resource in New York State," *Animal Science*, Cornell University, Ithaca, N.Y., 108 (2002)). In addition, these systems are important components of total manure management strategies. The biogas produced by anaerobic digesters is typically 50-80% methane with the remainder being $CO_2$, and there is typically about 4000 ppmv of $H_2S$ in the gas mixture (Zicari 2003), although levels in some tests were as high as 30,000 ppm in a recently restarted fermenter.

In addition to bioenergy production systems, copious amounts of the gas are produced by sewage treatment and waste water treatment plants. $H_2S$ must be removed from these gas streams to avoid nuisance and toxic odors. In addition, if the gas is flared without $H_2S$ removal, $SO_2$ will be formed and this results in air pollution and acid rain.

$H_2S$ is also produced as a bioproduct of various industrial processes. In these processes, other materials are produced along with $H_2S$. These materials include, for example, other reduced sulfur compounds such as mercaptans. Industries where $H_2S$ and other reduced sulfur compounds are produced include, but are not limited to, the petroleum extraction and refining processes, food processing where sulfur compounds are used, and in odor nuisance abatement of all sorts, including farm operations. Therefore, there is a need for methods and compositions for the removal of $H_2S$ and other reduced sulfur compounds from gaseous mixtures as well as liquid mixtures (e.g., water containing $H_2S$ or other reduced sulfur compounds).

There are several types of systems for removal of $H_2S$ from gas streams. Many of them use iron as the active ingredient. The difference between them is the delivery system, and this may dramatically affect both ease of operation and expense. Such systems are based on several chemical reactions, as follows:

1. $Fe^{+2} + H_2S \rightarrow FeS + 2\,H^+$
2. $Fe_2O_3.H_2O + 3\,H_2S \rightarrow Fe_2S_3 + 4\,H_2O$
3. $Fe_2S_3 + 3O_2 + 2\,H_2O \rightarrow Fe_2O_3.H_2O + 6S$ (regeneration of matrix using oxygen)

These few reactions appear rather simple. However, making commercially useful systems based upon these reactions may be complex, given the fact that iron, unless chelated to expensive and somewhat labile organic molecules, precipitates from solution at pH levels above 1.5-2.0, depending on the concentration. Most processes, other than those using chelated iron, use ferrous or ferric hydroxide, which forms a slimy precipitate that makes its use difficult. Some of the older materials (e.g. IRON SPONGE, Connelly-GPM, Inc., Chicago, Ill.) may combust spontaneously if on an organic surface. To avoid such difficulties, materials such as SULFATREAT (SulfaTreat, a business unit of M-I, LLC, Chesterfield, Mo.) come already processed on a ceramic base. Thus, the material must be produced in a factory, dried, and then shipped. The solid matrices such as iron sponge and SULFATREAT are usually more economical for smaller facilities, while more complex systems involving chelated iron may be more suited to larger users. However, even IRON SPONGE and SULFATREAT may not be economical for many applications.

IRON SPONGE is an old technology (used for more than 100 years). It uses ferric oxide or hydroxide coated onto wood chips. In particular, the iron is coated onto the surface of platelets of bark or wood (e.g., about ⅛×3×1 inches). The chips are loaded into columns or silos, then the moist biogas is passed through and $H_2S$ is efficiently removed. One major disadvantage of this system is that Reaction 3 (above) is exothermic and when the products from Reaction 2 (above) are exposed to air, spontaneous combustion may occur. Service providers to safely handle this issue are required and so the system may not be particularly well suited to small scale operations, such as dairy farms (see www.marcabcoinc.com/article.htm). However, currently, it probably is the simplest and least expensive system to operate. One factor limiting its usefulness is the fact that the number of regeneration cycles using Reaction 3 (above) is limited usually to about three (www.marcabcoinc.com/page4.html), and even with these few cycles, efficiency is reduced. Clearly, a system that can be regenerated without loss of efficacy many more times would be much more cost-effective. IRON SPONGE has an advantage over some other systems, in that there is a small pressure drop in the filtering medium.

SULFATREAT, SULFUR-RITE® (Merichem, Schaumburg, Ill.), and related systems are basically the IRON SPONGE systems, but with the iron hydroxides coated onto diatomaceous earth or similar materials. This eliminates the pyrogenic problems. SULFATREAT has been used to treat more than 1 trillion cubic feet of gas annually (Braga, T. G., octane.nmt.edu/sw-pttc/proceedings/H2S_05/Sulfatreat-.pdf). It passes all environmental tests, is nontoxic, and has shown good results when used as a plant fertilizer. One version of the process is described in detail in U.S. Pat. No. 6,500,237. There are various versions of the process, including recovery of free sulfur (Reaction 3) in the molten form (see www.hydrocarbonengineering.com/Hydrocarbon/he_sulfur_sulfa.htm, www.tda.com/Library/docs/SulfaTreat%20rev%20-DO_V2a.pdf).

One disadvantage to SULFATREAT and related systems is that relatively high pressure must be used to force gas through the systems and so the initial costs are increased due to the requirement for high pressure vessels. Both the SULFATREAT and IRON SPONGE systems are produced at central locations, which requires expensive shipment.

LO-CAT® (Merichem, Schaumburg, Ill.) and its related systems use the same basic iron chemistry as SULFATREAT. However, its innovation is the use of an iron chelate to keep the iron in solution. These liquid systems generally consist of two vessels. In the first vessel is a solution containing chelated ferric compounds where sulfur is trapped (Reaction 2), and where the iron oxidizes the $H_2S$ to elemental sulfur and ferrous iron. The solution containing the ferrous iron is then pumped to a second tank where oxygen is introduced to convert the ferrous to ferric iron to regenerate the system. This system is not well suited to smaller scale operations (Heguy and Nagel, at www.gtp-merichem.com/support/technical-_papers/state_of_iron_redox.php). The systems require extensive monitoring and evaluation.

Hydrogen sulfide removal systems not using iron as the absorptive ion also exist (see, e.g., U.S. Pat. Nos. 6,500,237; 6,544,492; 6,551,570; 7,004,996; and 7,427,383).

There is a need for an improved and less expensive method for removing hydrogen sulfide and other reduced sulfur compounds from gaseous and liquid mixtures. There is a particular need for a regenerable sulfur removal system that is cost effective, efficient, and able to be used on-site (e.g., in biomethane production from anaerobic digesters, landfills, water treatment and processing plants, the petroleum industry, dairy farms, and others).

The present invention is directed to overcoming these and other deficiencies in the art.

SUMMARY OF THE INVENTION

In one aspect, the invention relates to a method for removing sulfur from a gaseous or liquid mixture. This method involves contacting the gaseous or liquid mixture with an iron-enriched matrix under conditions effective to remove sulfur from the mixture through adsorption of the sulfur to the matrix. The iron-enriched matrix used in this method is a lignocellulosic material that is enriched with iron.

In another aspect, the invention relates to a system for removing sulfur from a gaseous or liquid mixture. The system comprises a reaction unit that includes a chamber having an inlet for introducing the mixture into the chamber and an outlet for expelling the mixture out of the chamber. The system also comprises an iron-enriched matrix contained within the reaction unit. In a particular embodiment, the matrix is a lignocellulosic material enriched with iron, and is effective to remove sulfur from the mixture.

A further aspect of the invention relates to a composition for removing sulfur from a gaseous or liquid mixture. The matrix includes a lignocellulosic material enriched with iron and is effective to remove sulfur from a gaseous or liquid mixture.

A further aspect of the present invention relates to a method for making the composition for use in removing sulfur from a gaseous or liquid mixture. This method involves providing a lignocellulosic material. Thereafter, iron is combined with the lignocellulosic material under conditions effective to yield a matrix comprising a lignocellulosic material enriched with iron, where the matrix is effective to remove sulfur from a gaseous or liquid mixture.

Another aspect of the invention relates to a method for preparing a plant fertilizer. This method involves providing the composition of the present invention. A gaseous or liquid mixture that contains sulfur is thereafter contacted with the composition under conditions effective to remove sulfur from the mixture through adsorption of the sulfur to the matrix, thereby yielding a plant fertilizer that includes iron, sulfur, and lignocellulosic material.

In another aspect, the invention relates to using the plant fertilizer to fertilize land for agricultural use.

The present invention is useful in that it provides an improved and less expensive method of removing hydrogen sulfide and other reduced iron compounds from liquid and gaseous mixtures. Another advantage of the present invention is that it provides for a regenerable method for removing the hydrogen sulfide and other reduced iron compounds from liquids and gases. For example, one particular advantage is the use of the present invention for removing hydrogen sulfide from gas streams, where a waste product (e.g., dried manure) is used as the sulfur-removing matrix. The manure (or other similar waste product) is treated with iron salts in various forms to form a matrix that can be readily regenerated for reuse multiple times.

The present invention is also useful in that it provides an improved sulfur removal system and method that can be used in both small-scale and large-scale settings. While the present invention's sulfur removal system can be used virtually anywhere, one key advantage over existing systems is that the present invention can be used in smaller, discrete sites such as smaller landfills, farm-based anaerobic fermenters for biogas production, and in removal of $H_2S$ from gases evolving from sewage treatment plants, open sewers, and the like.

Some attributes of particular embodiments of the regenerable sulfur removal method and system of the present invention include, for example, the following: (1) production of the absorptive matrix from agricultural waste products and other inexpensive materials; (2) a composition of matrix that minimizes the potential for combustion by using materials that are resistant to combustion during regeneration; (3) a system that has a small pressure drop over the system; (4) a system that uses waste products that are available virtually anywhere and so can be produced near the site of use, thereby minimizing shipping costs; (5) a medium that can be regenerated using Reaction 3 (above) multiple times, without reduction in efficiency in removal of $H_2S$, which dramatically reduces the cost of use of the material; (6) methods of use that permit multiple regenerations using economical processes that avoid combustion due to heating during regeneration and that maintain pH at an effective level; and (7) a product of reaction that can be used as a farm fertilizer or otherwise as landspread.

These, and other objects, features, and advantages of this invention will become apparent from the following detailed description of the various aspects of the invention taken in conjunction with the accompanying drawings.

BRIEF DESCRIPTION OF THE DRAWINGS

FIGS. 1A-1B are schematic drawings of various embodiments of the system and reaction unit of the present invention.

DETAILED DESCRIPTION OF THE INVENTION

The present invention relates to a method for removing sulfur from a gaseous or liquid mixture. This method involves contacting the gaseous or liquid mixture with an iron-enriched matrix under conditions effective to remove sulfur from the mixture through adsorption of the sulfur to the matrix. The iron-enriched matrix used in this method is a lignocellulosic material that is enriched with iron. As used herein, the terms "medium" and "media" may also be used to refer to the "matrix."

In one embodiment of this method, contacting the gaseous mixture with the iron-enriched matrix is carried out by passing the gaseous mixture through the matrix. In another embodiment of this method, contacting the liquid mixture with the iron-enriched matrix is carried out by passing the liquid mixture through the matrix.

The gaseous or liquid mixture is meant to include any gaseous or liquid mixture that contains sulfur. With regard to liquid mixtures, such liquid mixtures can contain dissolved sulfur compounds therein. In one embodiment, the sulfur is in the form of one or more sulfur compounds, including, but not limited to hydrogen sulfide, mercaptans, thiophenes, monosulfides, disulfides, or mixtures thereof.

Mercaptans can include, without limitation, methyl mercaptan, ethyl mercaptan, n-propyl mercaptan, iso-propyl mercaptan, iso-butyl mercaptan, tert-butyl mercaptan, n-butyl mercaptan, sec-butyl mercaptan, iso-amyl mercaptan, n-amyl mercaptan, α-methylbutyl mercaptan, α-ethylpropyl mercaptan, n-hexyl mercaptan, 2-mercapto hexane, 3-mercapto hexane, and homologs of the foregoing. Some specific mercaptans include, but are not limited to, 1-ethanthiol, 2-propanethiol, 2-butanethiol, 2-methyl-2-propanethiol, pentanethiol, hexanethiol, heptanethiol, octanethiol, nonanethiol, and thiophenol.

Thiophenes can include, without limitation, alkyl substituted thiophene, thiophenol, alkylthiophene, benzothiophene, 2-methylthiophene, 3-methylthiophene, 2-ethylthiophene, benzothiophene, and dimethylbenzothiophene.

Monsulfides and disulfides can include, without limitation, dimethyl sulfide, dimethyl disulfide, carbonyl sulfide, carbon disulfide, and similar compounds, including homologs of the foregoing.

A suitable iron-enriched matrix of the present invention is one that contains about 4 to about 40 percent iron on a dry weight basis. In particular, the matrix can have an iron content on a dry weight basis of about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 percent. The listing of these particular iron content values is not meant to limit the suitable iron content of the matrix. Instead, any iron content value that falls between about 4 and about 40 percent (on a dry weight basis) is contemplated for the matrix of the present invention.

The iron used to enrich the matrix can be an alkaline iron. As used herein, "alkaline iron" includes, but is not limited to, ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof. In a particular embodiment, iron carbonates are used in view of their nonflammable characteristics. The alkaline iron can be in liquid form (e.g., a suspension of fine particulate ferrous or ferric carbonate) and/or precipitated onto and into solid agricultural waste products.

A suitable iron-enriched matrix of the present invention is also one that has a pH of 4.5 or higher. In particular, the matrix can have a pH between about 4.5 and about 10.0, including, but not limited to, a pH of about 4.5, 5.0, 5.5, 6.0, 6.5, 7.0, 7.5, 8.0, 8.5, 9.0, 9.5, or 10.0. The listing of these particular pH values is not meant to limit the suitable pH values of the matrix that are within the about 4.5 and about 10.0 range. Instead, any pH value that falls between about 4.5 and about 10.0 is contemplated for the matrix of the present invention. For example, a suitable matrix pH can be 4.7 or 5.2, even though these values are not specifically listed above.

A suitable lignocellulosic material can include, but is not limited to, a lignocellulosic material from a plant source, a product of composting, bark, indigestible components of plants that pass through ruminant animals and that are recovered from manures or manures plus bedding materials, or mixtures of the aforementioned suitable lignocellulosic materials. The composting product can be a product of thermal composting or earthworm-mediated composting. Examples of suitable lignocellulosic materials for use in the present invention can also include those described in U.S. Patent Application Publication No. US-2008/0277351, which is incorporated by reference herein in its entirety.

In a particular embodiment, manure is used as the matrix. The manure can be obtained from various animals, including, without limitation, from ruminant animals. In another particular embodiment, the manure is used in a dry form, although the manure can also be used in a partially dry form.

If bark is used as the matrix, it can be in the form of ground or fragmented bark that is highly porous. Therefore, unlike IRON SPONGE, which uses platelets of bark or wood (with iron merely coated onto the surface thereof), the present invention (if bark is used) makes use of a highly porous wood matrix having large openings that permit gas to flow both around and through the matrix and allow more free space for regenerated sulfur to accumulate. The bark can be from various plants or trees. Suitable examples of bark can include, without limitation, aged bark. The bark may be aged by placing ground bark in a pile where primarily anaerobic microbial processes cause significant heating and degrade free sugars and other similar materials. Such aged barks are readily available from landscaping product suppliers (e.g., as mulches for plants). In a particular embodiment, the aged bark is from a pine tree or other softwood trees. The use of bark from hardwood trees is also contemplated by the present invention. The use of mixtures of hardwood and softwood bark is additionally contemplated by the present invention.

The method for removing sulfur from a gaseous or liquid mixture can further involve regenerating the matrix by removing sulfur from the matrix after the contacting step, thereby yielding a regenerated matrix that is able to adsorb sulfur. In one embodiment, the regenerating step can include passing air through the matrix to yield the regenerated matrix. For example, regeneration can be accomplished by passing an oxygen-containing atmosphere (ambient air is preferred) through the matrix after it has fully reacted with sulfur compounds to give a fully blackened medium, or after $H_2S$ or other sulfur compounds are detected in the exhaust stream at levels that are objectionable for the application in question. The oxygen-containing atmosphere is passed through the medium until the original brown color of the medium is recovered. Alternatively, in liquid systems, oxygen may be dissolved in water and a similar regeneration to that described above is accomplished.

The method for removing sulfur from a gaseous or liquid mixture can further involve repeating the steps of contacting the mixture with the matrix and regenerating the matrix after the contacting step. In one embodiment, the repeating step is performed until the matrix is unable to be regenerated or until sulfur accumulation in the matrix adversely affects gas or liquid flow through the matrix. In a particular embodiment, the method is effective to enable the repeating step to be performed up to 10 times (or more) before the matrix is unable of being regenerated or until sulfur accumulation in the matrix adversely affects gas or liquid flow through the matrix. The present invention also contemplates performing the repeating step less than or more than 10 times, depending on the particular application and the efficacy of sulfur removal after a particular number of repeating steps. One of ordinary skill in the art can readily determine how many repeating steps can be performed by monitoring the efficiency and efficacy of sulfur removal from the gaseous or liquid mixture (as described herein). For example, one of ordinary skill in the art would be able to recognize whether fouling or plugging of components in the gaseous or liquid mixture being purified is limiting regeneration after a particular repeating step.

The method for removing sulfur from a gaseous or liquid mixture can further involve monitoring the matrix for changes in color, where the color black indicates a sulfur-saturated matrix. For example, a suitable matrix prior to being contacted with sulfur-containing gaseous or liquid mixtures will be brown or lighter. Monitoring can involve direct or indirect visual monitoring during the sulfur removal method. Indirect visual monitoring can involve using computer and video systems to enable one to determine the coloration of the matrix. Alternatively, the efficacy of the system can be monitored by measuring the level of $H_2S$ or other reduced sulfur compounds that are present in the effluent gas or liquid. The system would be regenerated when the level of $H_2S$ or other reduced sulfur compounds reaches set limits imposed on the operation.

The method for removing sulfur from a gaseous or liquid mixture can further involve maintaining the pH of the matrix at about 4.5 or higher prior to the contacting step. Various methods for achieving the desired pH are well known by those of ordinary skill in the art. In one embodiment, maintaining the pH at the desired pH is carried out by contacting the matrix with a pH increasing agent. A suitable pH increasing agent includes, but is not limited to, an alkaline gas. Various alkaline gases that can be used as a suitable pH increasing agent are well known to those of ordinary skill in the art. In one embodiment, the alkaline gas is ammonia. Natural sources of alkaline gases are also contemplated for use in the method.

A reaction unit can be used to house the iron-enriched matrix during the removal of sulfur from the gaseous or liquid mixture. Therefore, in one embodiment of the method for removing sulfur from a gaseous or liquid mixture, the iron-enriched matrix is enclosed in a reaction unit. A suitable reaction unit can include, without limitation, a chamber having an inlet for introducing the gaseous mixture into the chamber prior to the contacting step and an outlet for expelling the gaseous mixture out of the chamber after the contacting step.

The chamber can be of various sizes and shapes (e.g., cylindrical, rectangular, etc.) that are suitable to allow gaseous or liquid mixtures to enter the chamber, come in contact with the matrix, and exit the chamber. The chamber can be made from various materials, preferably from a corrosion resistant metal (e.g., aluminum, stainless steel) or various types of plastics known in the art for such uses. The chamber can be of various sizes ranging from containers many thousands of cubic feet to vessels of one cubic foot capacity or less, depending on the method and use and the intended application. The gas or liquid may be introduced from the top, side, or bottom, or other configuration. In one embodiment, the port of entry can be constructed so that the liquid or gas to be treated passes evenly through the medium (e.g., the matrix) in the container.

A suitable chamber can include, without limitation, various containers, vessels, barrels, and the like that are already available for containing liquids, gases, and/or solid materials. For example, in one embodiment, the chamber can include, without limitation, a 55-gallon barrel or the like.

The present invention also relates to a system for removing sulfur from a gaseous or liquid mixture. The system includes at least one reaction unit (as described herein), where the reaction unit contains the iron-enriched matrix (as described herein).

In one embodiment, the system can further include a layer of porous or filter material contained within the reaction unit. The porous or filter material can include, without limitation, gravel, bark, or any other inert material with a high level of porosity. The porous material can be covered with a filter material (e.g., landscaping fabric). The layer of porous or filter material can be deposited above, below, or above and below the matrix. The porous or filter material can be included in an amount that will be effective to allow the reaction unit to function according to the present invention. In one embodiment, the porous or filter material can be included at a level from about 1 to about 50 percent of the height of the chamber. In a particular embodiment, the porous or filter material is included at about 5 percent of the height of the chamber.

In another embodiment, the system can further include a diffuser located adjacent to and/or within the layer of porous material. A suitable configuration for efficient use can be one in which the diffuser is constructed so as to facilitate the front of advancing gas to proceed in a linear (e.g., flat) or substantially linear fashion through the mass of the matrix. A diffuser constructed that allows more gas to proceed into the matrix at one point more than any other can degrade the efficiency of the system. The diffuser can be of any of several designs and located adjacent to and/or within the porous material. Suitable diffusers are well known by those of ordinary skill in the art.

In another embodiment, the system can further include a moisture delivery device for adjusting the moisture content of the matrix. Suitable moisture content of the matrix can vary depending on the application. In a particular embodiment, the moisture content of the matrix is to be maintained at about 40 percent on a dry weight basis. However, other suitable levels of moisture content of the matrix are contemplated by the present invention. For example, in further embodiments, the moisture content of the matrix can range from about 20 to about 60 percent, from about 25 to about 55 percent, from about 30 to about 50 percent, or from about 35 to about 45 percent on a dry weight basis. Suitable methods for maintaining the moisture content can include, without limitation, adding water to the supporting matrix or to the incoming gases. Other methods of maintaining a particular moisture content of the matrix are well known in the art and are contemplated by the present invention. In one embodiment, the matrix can be kept moist by partially filling the matrix with water. In a particular embodiment, water can be automatically added using a standard float valve system if the water level drops below a predetermined acceptable level, which level can be determined based on the particular application and composition used in the sulfur removal system of the present invention.

In an additional embodiment, the system is such that there is a small (or low) pressure drop over the system. One of ordinary skill in the art would recognize that the amount of pressure drop would depend on the flow rate of the gas (e.g., greater pressure drop at high flow rates) and the size and configuration of the reaction unit or chamber (e.g., a chamber with a high height-to-width ratio will have a greater pressure drop than a chamber with a low height-to-width ratio). By way of example, in one embodiment, the system can be configured so that the system has a low pressure drop of about 1-10 inches of water.

In another embodiment, the system can further include multiple reaction units. The multiple reaction units can be connected in a serial configuration, a parallel configuration, or in a combination of serial and parallel configurations. Methods and materials for connecting the multiple reaction units in particular configurations are well known by those of ordinary skill in the art.

Figure 1A:
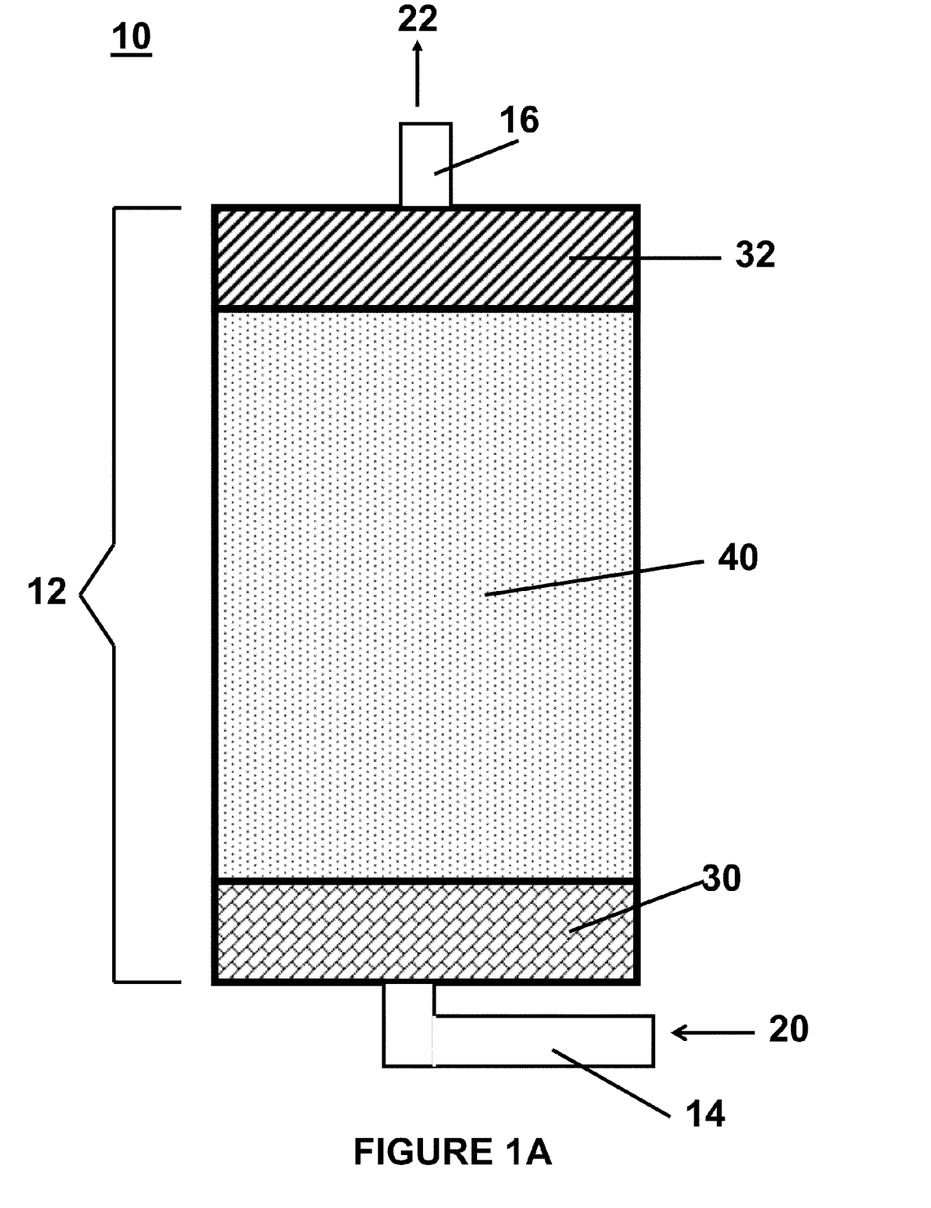
FIG. 1A illustrates a system in which the reaction unit is in a vertical configuration.
Figure 1B:
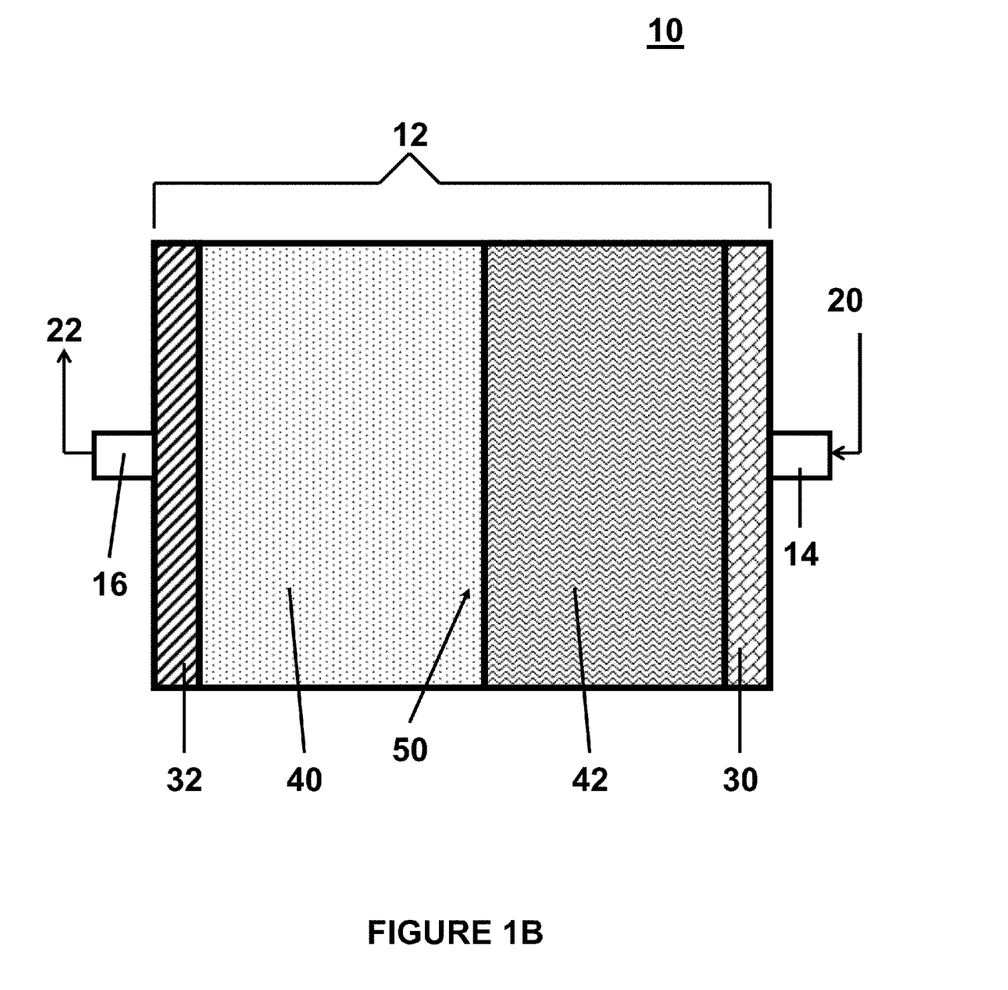
FIG. 1B illustrates a system in which the reaction unit is in a horizontal configuration.

FIGS. 1A-1B illustrate various embodiments of the system and reaction unit of the present invention.

Referring to FIG. 1A, reaction unit 10 is provided in a vertical configuration. For illustration purposes, removal of sulfur from a gaseous mixture involves feeding a sulfur-containing gaseous mixture 20 through inlet 14 to introduce gaseous mixture 20 into chamber 12. Upon entry into chamber 12, gaseous mixture 20 is then contacted with diffuser/filter 30. As gaseous mixture 20 moves through diffuser/filter 30, gaseous mixture 20 is presented as a reactive front 50 as it passes through matrix 40 (see FIG. 1B for a schematic description of reactive front 50, as FIG. 1A does not include a schematic description of reactive front 50). As gaseous mixture 20 passes through matrix 40, sulfur is adsorbed to matrix 40, thereby removing sulfur from gaseous mixture 20 to yield clean gas 22, which exits chamber 12 through outlet 16. Prior to exiting chamber 12 through outlet 16, clean gas 22 passes through headspace/filter 32. As shown in FIG. 1A, this particular embodiment is such that gaseous mixture 20 passes through chamber 12 in a vertical manner from the bottom of chamber 12 to the top of chamber 12. However, FIG. 1A is in no way meant to limit the configuration of the system and reaction unit of the present invention. Further, although the embodiment shown in FIG. 1A involves a gaseous mixture, the present invention also involves systems and reaction units for removing sulfur from liquid mixtures. In addition, as mentioned above, multiple reaction units 10 can be connected in series and/or in parallel according to the specific needs of the application.

Referring to FIG. 1B, reaction unit 10 is provided in a horizontal configuration. FIG. 1B is also being presented to further illustrate the movement of reactive front 50 through chamber 12. In FIG. 1B, sulfur-containing gaseous mixture 20 passes through chamber 12 from right-to-left. However, this is just for illustration purposes and does not limit the direction of gas or liquid flow through chamber 12. For illustration purposes, removal of sulfur from a gaseous mixture involves feeding a sulfur-containing gaseous mixture 20 through inlet 14 to introduce gaseous mixture 20 into chamber 12. Upon entry into chamber 12, gaseous mixture 20 is then contacted with diffuser/filter 30. As gaseous mixture 20 moves through diffuser/filter 30, gaseous mixture 20 is presented as a reactive front 50 as it passes through matrix 40. As gaseous mixture 20 passes through matrix 40, sulfur is adsorbed to matrix 40, thereby removing sulfur from gaseous mixture 20 to yield clean gas 22, which exits chamber 12 through outlet 16. Sulfur-adsorbed matrix 42 results after gaseous mixture 20 passes through that portion of matrix 40. Prior to exiting chamber 12 through outlet 16, clean gas 22 passes through headspace/filter 32. In a particular embodiment, diffuser/filter 30 creates a flat reactive front 50. When the reactive front 50 reaches the far end of matrix 40, matrix 40 (represented as matrix 42 after gaseous mixture 20 passes through matrix 40) can then be regenerated. However, the present invention also contemplates regenerating matrix 40 before reactive front 50 reaches the far end of matrix 40. As shown in FIG. 1B, in a particular embodiment, in order to regenerate matrix 40, reaction unit 10 is taken off-line to introduce air into reaction unit 10 to regenerate matrix 40 (as described herein). As shown in FIG. 1B, this particular embodiment is such that gaseous mixture 20 passes through chamber 12 in a horizontal manner from one end of chamber 12 to the other end of chamber 12. However, FIG. 1B is in no way meant to limit the configuration of the system and reaction unit of the present invention. Further, although the embodiment shown in FIG. 1B involves a gaseous mixture, the present invention also involves systems and reaction units for removing sulfur from liquid mixtures. In addition, as mentioned above, multiple reaction units 10 can be connected in series and/or in parallel according to the specific needs of the application.

The present invention further relates to a composition for removing sulfur from a gaseous or liquid mixture. The composition includes a matrix that includes a lignocellulosic material enriched with iron, and that is effective for use in removing sulfur from a gaseous or liquid mixture. The matrix of the composition is as described herein. Therefore, particular characteristics and components of the matrix are not repeated here. As noted previously, however, in one embodiment, the composition can be manure loaded with iron. In another embodiment, the composition can be made of ground or other fragmented bark containing ferrous or ferric ions. This embodiment can be prepared by adding ferric or ferrous iron solutions from the chloride or the sulfate salts, respectively, to the bark to saturation. The pH of the bark can then be adjusted to a final pH of 4.5 or higher.

The present invention also relates to a method for making the composition for use in removing sulfur from a gaseous or liquid mixture. This method involves providing a lignocellulosic material (described herein). Thereafter, iron is combined with the lignocellulosic material under conditions effective to yield a matrix comprising a lignocellulosic material enriched with iron, where the matrix is effective to remove sulfur from a gaseous or liquid mixture. The various aspects of the composition are described elsewhere herein.

The present invention additionally relates to a method for preparing a plant fertilizer. This method involves providing the composition of the present invention. A gaseous or liquid mixture that contains sulfur is thereafter contacted with the composition under conditions effective to remove sulfur from the mixture through adsorption of the sulfur to the matrix, thereby yielding a plant fertilizer that includes iron, sulfur, and lignocellulosic material. A plant fertilizer produced by this method is also contemplated by the present invention. The plant fertilizer of the present invention is effective to provide: (a) organic material to enrich the soil that comes from the manure matrix; (b) sulfur that will oxidized to sulfate to create a more acidic environment; (c) iron that is required for plant growth and plant greenness; and (d) nitrogen and other plant nutrients that arise from the manure component.

The present invention further relates to using the plant fertilizer to fertilize land for agricultural use. One of ordinary skill in the relevant art will readily understand how to apply the plant fertilizer to the land. In one embodiment, the plant fertilizer of the present invention can be applied to soils where an acidification of the soil is desired. Examples of such soils include, without limitation, highly alkaline soils such as those frequently found in the western United States, and soils for the production of crops such as blueberries or rhododendrons that require highly acidic soils for optimal growth.

EXAMPLES

The following examples are intended to illustrate particular embodiments of the present invention, but are by no means intended to limit the scope of the present invention.

Example 1

Laboratory Testing

Most sulfur removal systems such as IRON SPONGE and SULFATREAT use FeO or $Fe(OH)_{2-3}$ as the absorptive Fe species that is coated onto organic or inorganic particles. There are disadvantages to this species of iron. In experiments relating to the present invention, iron carbonates were used rather than the oxide or hydroxides. Advantages of the carbonates include limiting the potential for spontaneous combustion. If organic substances such as bark or wood are used as the matrix, spontaneous combustion may occur when the spent medium is removed (e.g, as with IRON SPONGE products), but the initial ferric or ferrous carbonate materials are nonflammable. Further, metal oxides or hydroxides form rather slimy precipitates that are difficult to handle; iron carbonates are much easier to use. The ferrous or ferric carbonate materials are useful either as liquids (a suspension of finely particulate ferrous or ferric carbonate) or with the materials precipitated onto and into solid agricultural waste products.

In first tests, aged pine bark sized to have a particle size between 1/16 and 1/4 in (1.6×6 mm) was mixed with $CaCO_3$ and then mixed with a solution of $FeSO_4$ to provide a final pH level of about 8. The concentration of iron in the medium was 0.8%, as determined by dry ashing followed by ICP analysis. The bark-iron mixture was loosely packed into a 7×17 cm column (appx. 500 $cm^3$) and a reagent gas containing 500 ppmv $H_2S$ in a 1:1 mixture of carbon dioxide:methane was passed into the column in reverse flow. A total of 102 L of gas was passed through the column, but breakthrough of $H_2S$ did not occur. $H_2S$ in the gas exiting the column was never detected at flow rates ranging from 5 to 62 $cm^3$/min.

Example 2

Field Trials

Based on the findings set forth in Example 1, the next step was to attempt hydrogen sulfide removal from gas from a commercial landfill at a site near Buffalo, N.Y. (referred to herein as the "Schulz landfill"). A number of different matrices were tested in columns consisting of 55 gallon barrels. Landfill gas was passed through a diffuser at the bottom and gas exited from the barrel tops. The most successful were bark matrices containing ferrous or ferric ions. These were prepared from ferric or ferrous iron solutions from the chloride or the sulfate salts, respectively. The pH values of the original solutions were 1.0 (or less) for ferric chloride and only slightly higher for ferrous sulfate. These solutions were added to the bark to saturation and then $Na_2CO_3$ solutions were added to adjust the final pH of the matrix to about 5.5. The concentration of iron in the bark matrix was about 4% by weight. In the systems tested at the Schulz landfill, about 80% of the $H_2S$ were removed with a 20 second transit time.

For ferrous iron in the systems tested at the Schulz landfill at the bottom of the trapping units where saturation was expected to be complete, the weight of sulfur:iron (w/w) was determined (following nitric acid digestion and ICP analyses) to be 0.52:1 and 0.62:1 in slightly different systems. For ferric iron, ratios of about 0.5:1 were determined. Since the molecular weight of iron is 55.8 and of sulfur is 32.1, the weight ratio for a compound containing equal molar concentrations of Fe and S would be 57%. Thus, the values are reasonably consistent with the reactions shown earlier. However, all of this assumes a single pass. If the iron is regenerated by passage of air (reaction 3 shown earlier), then each succeeding step is expected to provide a higher cumulative total until the deposited sulfur plugs the system (see, e.g., U.S. Pat. No. 6,500, 237, which is hereby incorporated by reference herein in its entirety). It is also important to note that the reaction of some iron sulfides and oxygen is strongly exothermic and so these materials on organic substrates may spontaneously combust.

After testing the materials that were produced, it was determined that these materials, after drying, would not burn even when directly exposed to a flame from a propane torch.

Example 3

High Iron Loading

Phase I and II studies indicated strongly that a critical parameter for both economic and chemical efficiency was the level of iron loading of the bark. The pH of the final matrix needs to be between 6 and 8 to avoid conversion of FeS back to $H_2S$. As various materials were tested, dry manure appeared to be a better matrix material than the tree bark used earlier. Dry manure has a very high water holding capacity; useful mixtures can contain up to 80% moisture on a dry weight basis and still remain a free-flowing, easily handled material. Thus, if iron solutions or suspensions are made and added to manure or bark, a high level of iron can be loaded. Further, manure has a higher salt content than bark, and is difficult to combust, so the issues of pyrolytic reactions are lessened. Third, manure is a readily available material and, if used for on-farm digesters, the manure on the farm can be used for hydrogen sulfide removal. Thirdly, after a matrix is prepared, the highly porous nature of manure particles are such that gases easily permeate them. Thus, gases containing $H_2S$ can be efficiently removed. Finally, a highly permeable medium was expected to be superior to a more compact medium such as wood or wood bark or synthetic substances in terms of regeneration. The number of times that an iron-based medium can be regenerated is dependent upon porosity. Sulfide buildup on the iron oxide inhibits efficient reaction with hydrogen sulfide (www.marcabcoinc.com/page4.html) and so the ability of the medium to form a sponge-like medium as regeneration occurs is expected to be a significant advantage.

A method for producing iron removing media was developed. In this process, dry manure and $Na_2CO_3$ are dry blended at a ratio of about 4:1 to 5:1. A mixture of $FeSO_4$ (30% iron) is added with constant mixing to water to give a ratio of about 0.6 kg of the salt per L of water. After this material produces a solution with some suspended crystals, NaOH is added until the pH is about 4. This mixture is then blended in a rotary, paddle or other mixer until a consistent suspension is produced. The final medium ought to have a pH of between 6 and 8 and contain 15 to 25% iron on a dry weight basis. The amount of $FeSO_4$ used is about 100 lb per cubic yard of medium. Other forms of iron can be used as well; for example, $FeCl_3$ or other convenient forms, with similar results. This high iron loading rate can be used successfully in the present invention. It contains iron at least partially in the carbonate form. It cannot be burned when either dry or wet.

It also should be understood that a liquid suspension of a pH between 5 and 9 and made up in a fashion similar to that above can also be used as $H_2S$ removal medium. For this application, the carbonate form is essential since the hydroxide forms become viscous at relatively low concentrations and would preclude a process where bubbling of gas through the liquid suspension can occur.

Example 4

Operation of Systems

The medium prepared as described above can be packed into a container and $H_2S$ removed as it passes through. In one embodiment of the invention, the container is a cylinder that contains a layer of loose porous material that fills the container to a level of about 5% of its height. The layer of loose material may be composed of gravel, bark, or any other inert material with a high level of porosity. A fitting to the gas to be cleansed is located on the bottom of the container and a diffuser of any of several designs is located within the loose material. The porous material is covered with a filter material (for example landscaping fabric) and the manure-based medium (e.g., of Example 3) is used to fill the container. A lid is fitted onto the container with an outlet fitting for the cleansed gas. The container is sized depending upon the amount of $H_2S$ to be removed and the expected flow rate.

The medium should remain moist when operating and so the porous material is partially filled with water. In one embodiment, the system includes a method to automatically add water if the level drops, such as a standard float valve system.

In trials, two separate systems were used to cleanse gas from a manure-based anaerobic fermenter that initially produced gas with about 30,000 ppm of $H_2S$, which upon continued operation dropped to about 6,000 ppm at 4-12 cfm of flow.

In one system, a series of small polycarbonate columns containing about 300 g of medium were used and run for a single cycle and then dried and the S and Fe content, a second was run to saturation and then regenerated by passing air through the column, and this was continued to 5 or 6 cycles, in two separate experiments. See the graphs of FIGS. 2 and 3 for the results.

Figure 2:
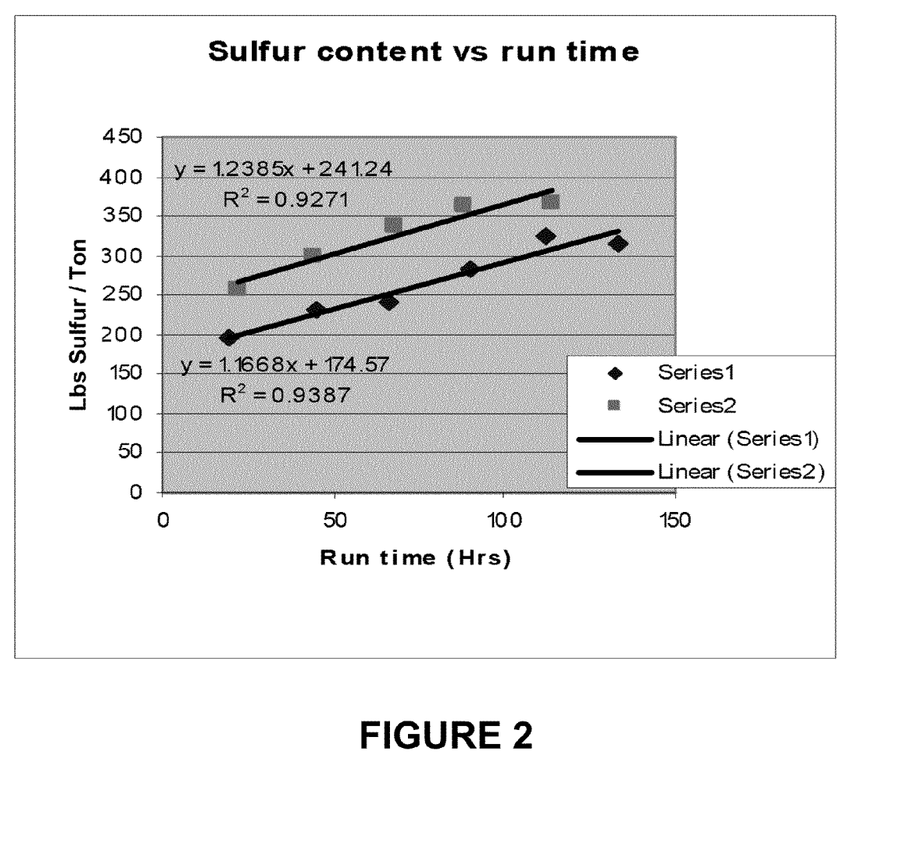
FIG. 2 is a graph illustrating sulfur accumulation from hydrogen sulfide ($H_2S$) passed into the Fe-manure matrix over time. Each point represents results after 1-5 or 6 regenerations with air. Two separate replications are shown by the two regression lines.
Figure 3:
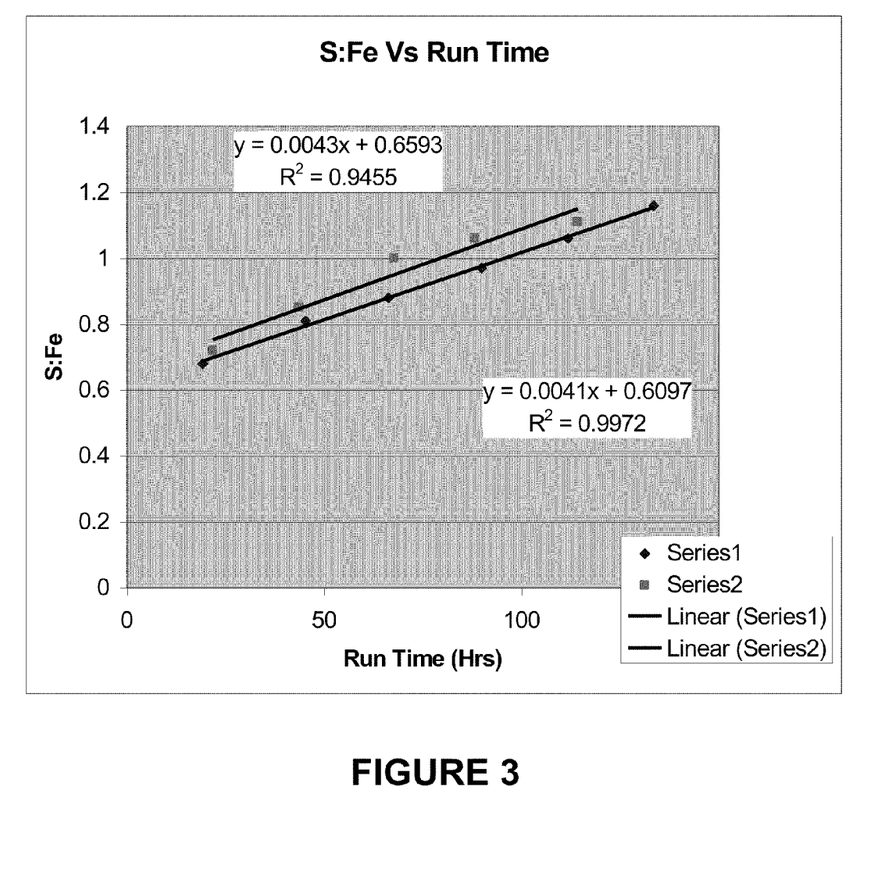
FIG. 3 is a graph illustrating the ratio of S:Fe over regeneration times. Each point represents results after 1-5 or 6 regenerations with air. Two separate replications are shown by the two regression lines.

The regression lines of sulfur accumulation or S:Fe ratio are linear, which demonstrates that the medium did not lose effectiveness with successive regeneration times, as is the case with competitive products. The two lines in FIG. 2 are somewhat different in position but not in slope, and this was due to different levels of Fe in the two compositions. The level of iron as shown in one line was about 17% and as shown in the other line was about 15%. With each regeneration, the level of S in the medium increased by about 60 lb/ton of medium. After a single pass, the weight of S/weight of matrix was about 3%, which was reasonably close to that described in U.S. Pat. No. 6,500,237, which accumulated up to 4.5%. If the maximum loading level of Fe of 25% were produced, the projected loading rate would be 4.6%.

However, by six cycles, the loading rate of sulfur can be increased to 16%, which is much better and the cost of regeneration is nearly zero. Thus, this system is highly efficient.

The other system used consisted of media loaded into 55 gallon barrels and through which the entire volume of gas from the anaerobic fermenter was passed. The media was generated about every 48 hr, and about 12 regeneration cycles were accomplished. At the start of the cycle in a well-packed system at least 95% of the $H_2S$ was removed, and the same was true after every cycle of regeneration. In many cases, up to 15% of the $H_2S$ was passing just before regeneration, but this can be overcome with two vessels in series, larger vessels, or more frequent regeneration. With this larger number of regeneration cycles, media with up to 500 lb of S per ton of media was produced, which is a total of 25% S per unit weight of final media. Further, with this larger number of regeneration cycles, media with more than 700 lb of S per original ton of medium was achieved. Calculations indicate that one should be able to remove at least one ton of S for every ton of original medium, for a final concentration of S in the medium of 50%. It is believed that this is much higher than other systems.

The pressure delivered by the anaerobic digester was very low, typically less than 1-5 inches of water. It was connected to a diesel engine that, in its intake cycle, pulled gas through the system. However the pressure differential was always less than 2 inches of water. Thus, there is very little impediment to gas flow through the porous medium, even, as was eventually the case, when there were as many as 12 regeneration cycles. Thus, in this system there is no requirement for pressure vessels as is the case with competitive products such as SUL-FATREAT.

The course of the reaction in the media can be followed by color and physical changes. The original manure matrix is dark brown in color, and as it absorbs $H_2S$ it becomes black. When it is regenerated it becomes yellow to tan, and then in the next cycle of absorption returns to black. As the regeneration cycles continue, the free-flowing manure medium becomes solid and sponge-like and after 10 cycles and regeneration, the result is a yellowish-tan material that is much like the consistency of pumice rock. This can be ground for reuse as fertilizer or disposal.

One other aspect is useful for successful operation of system of the present invention. In one embodiment, the pH of the matrix is maintained at a level above about 5 to avoid re-release of $H_2S$. The addition of 3-4% ammonia solution in the water required to maintain saturation of the system when the pH of the water solution decreases below pH 5 will suffice to maintain a high pH in the entire system. The volatile ammonia will pass through the system and effectively raise the pH of the medium to an acceptable level.

Example 5

Use of Spent Media

This present invention can be used to make break-even products that can be made from the spent media of the present invention. In one embodiment, the media contains high levels of sulfur (up to 30% by weight, primarily as elemental S), 12 to 25% by weight of iron, and the remainder is manure, which has an analysis of about 1.2:1:1 NPK (nitrogen, phosphorus and potassium), minor nutrients and the salts used provide pH adjustment—mostly sodium. Once the spent medium is in hand, the pumice-like material can easily be ground to a free-flowing powder. Thus, uses of the spent media can take advantage of this valuable composition.

The sulfur contained within the matrix could be recovered by heating to about 120° C. (250° F.), at which point S becomes a liquid. Thus, the matrix can be heated with pressurized steam and the liquid S removed.

In the remaining matrix, the iron content is sufficiently high that it can be extracted. A suspension of ferric or ferrous carbonates was made and a solution of dissolved $H_2S$ in water was added that was calculated to completely convert the $FeCO_3$ or $Fe_2(CO_3)_2$ to the ferrous or ferric sulfides. The original suspensions had a pH of 7-8 and the $FeCO_3$ suspension was a nonviscous aquamarine color while the $Fe_2(CO_3)_2$ suspension was brown. Upon addition of the $H_2S$ in solution with water mixing, a black precipitate of the iron sulfides formed that again was nonviscous. In order to investigate the possibility of regeneration (reaction 3), air was passed through the black suspensions overnight, and the suspensions both became brownish-yellow. This mixture was then extracted with tetrasodium EDTA to remove the iron, leaving elemental sulfur as the precipitate. These results confirm the reactions that were shown earlier. Atomic absorption analyses indicated that 60 and 100% of the Fe was extracted from the solutions that were derived from $Fe^{+3}$ and $Fe^{+2}$, respectively. This demonstrates that Fe can readily be extracted into an EDTA solution. FeEDTA is a valuable product. Given the manure that is present in the mixtures, other heavy metals also can be extracted and the mixture would make a useful plant nutrient. While EDTA was used in this example, there are many other chelating agents that will be useful, including malic acid, citric acid, EDDHA (ethylenediaminedi(o-hydroxyphenylacetic acid) or other chelating agents known to practitioners of the art. The materials hereafter are known as chelating agents.

These data confirm that the set of reactions described earlier perform as anticipated, and also demonstrates that the systems described herein can be successfully used to remove $H_2S$ from water as well as from air.

The remaining material is high in iron and other nutrients and could be used as a fertilizer, especially for acid loving plants, particularly if the medium at the end of the run is acid. Iron is deficient is some soils, as are micronutrients, and metallic micronutrients are more available in acid than in alkaline conditions. For any circumstance where acid-loving plants are grown, or where soil pH levels for any plant are above about pH 8 (most of the western United States), iron is a limiting nutrient. The form that is readily available to plants is the ferrous form, and ferrous sulfate is commonly sold for this purpose. The final materials after a single pass will have an acidic pH (typically pH 3.5-5) and contain ferrous iron. If on an organic matrix, this will degrade, thus providing valuable organic material to the soil, reduced iron that will be available to plants, and a reduction of soil pH. For on-farm use, even if soils are not alkaline or if acid-loving plants are not grown, the addition of the matrix or liquid will do no harm—for manure digesters, the sulfur is from manure anyway, which would be present in manure if applied directly and the iron or manure matrix are not harmful.

Sulfur also is sold as a fungicide to make sprays for control of plant diseases. It appears that the matrix as produced has sufficient sulfur to be effective and the manure and other ingredients would provide foliar nutrients, especially for plants grown in high pH soils.

Finally, the cheapest and simplest method of disposal is by landspreading. Manure that includes sulfur that would be obtained from plants, for example in an on-farm digester, iron and manure plus innocuous salts. Thus, it would be quite feasible to spread the final material from S absorption back onto land in the presence of farm manure, and at a low application rate per acre.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method for removing sulfur from a gaseous or liquid mixture, said method comprising:
   contacting a gaseous or liquid mixture with an iron-enriched matrix under conditions effective to remove sulfur from the mixture through adsorption of the sulfur to the matrix, and
   maintaining the pH of the matrix at about 4.5 or higher prior to said contacting,
   wherein said iron-enriched matrix comprises a lignocellulosic material enriched with iron.

2. The method according to claim 1, wherein said matrix has a pH of 4.5 or higher.

3. The method according to claim 1, wherein said matrix comprises about 4 to about 40 percent iron on a dry weight basis.

4. The method according to claim 1, wherein the lignocellulosic material is from a plant source.

5. The method according to claim 1, wherein the lignocellulosic material is the product of composting.

6. The method according to claim 1, wherein the lignocellulosic material is bark.

7. The method according to claim 1, wherein the lignocellulosic material comprises indigestible components of plants that pass through ruminant animals and that are recovered from manures or manures plus bedding materials.

8. The method according to claim 1, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 9. The method according to claim 1, wherein said sulfur is in the form of one or more sulfur compounds selected from the group consisting of hydrogen sulfide, mercaptans, thiophenes, monosulfides, and disulfides.

10. The method according to claim 1, wherein said contacting is carried out by passing the gaseous mixture through the matrix.

11. The method according to claim 1, wherein said contacting is carried out by passing the liquid mixture through the matrix, and wherein the liquid mixture contains dissolved sulfur compounds.

12. The method according to claim 1, wherein said matrix is enclosed in a reaction unit, said reaction unit comprising a chamber having an inlet for introducing the gaseous mixture into the chamber prior to said contacting and an outlet for expelling the gaseous mixture out of the chamber after said contacting.

13. The method according to claim 1 further comprising: regenerating the matrix by removing sulfur from the matrix after said contacting, thereby yielding a regenerated matrix that is able to adsorb sulfur.

14. The method according to claim 13, wherein said regenerating comprises passing air through the matrix to yield the regenerated matrix.

15. The method according to claim 13 further comprising: repeating the steps of contacting the mixture with the matrix and regenerating the matrix after said contacting.

16. The method according to claim 15, wherein said repeating is performed until the matrix is unable to be regenerated or until sulfur accumulation in the matrix adversely affects gas flow through the matrix.

17. The method according to claim 16, wherein said repeating is performed up to 10 times before the matrix is unable of being regenerated or until sulfur accumulation in the matrix adversely affects gas flow through the matrix.

18. The method according to claim 1 further comprising: monitoring the matrix for changes in color, wherein the color black indicates a sulfur-saturated matrix.

19. The method according to claim 1, wherein said maintaining the pH is carried out by contacting the matrix with a pH increasing agent.

20. The method according to claim 19, wherein the pH increasing agent comprises an alkaline gas.

21. The method according to claim 20, wherein the alkaline gas comprises ammonia.

22. A system for removing sulfur from a gaseous or liquid mixture, said system comprising:
a reaction unit comprising a chamber having an inlet for introducing the mixture into the chamber and an outlet for expelling the mixture out of the chamber; and
an iron-enriched matrix contained within the reaction unit, said matrix comprising a lignocellulosic material enriched with iron, wherein said matrix is effective to remove sulfur from the mixture, and wherein said matrix has a pH of 4.5 or higher.

23. The system according to claim 22, wherein said matrix comprises about 4 to about 40 percent iron on a dry weight basis.

24. The system according to claim 22, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 25. The system according to claim 22, wherein said sulfur is in the form of one or more sulfur compounds selected from the group consisting of hydrogen sulfide, mercaptans, thiophenes, monosulfides, and disulfides.

26. The system according to claim 22 further comprising:
a layer of porous or filter material contained within the reaction unit, said layer being deposited above and/or below the matrix.

27. The system according to claim 26 further comprising:
a diffuser located adjacent to and/or within the layer of porous material.

28. The system according to claim 22 further comprising:
a moisture delivery device for adjusting the moisture content of the matrix.

29. The system according to claim 22 further comprising:
multiple reaction units each containing the iron-enriched matrix, said multiple reaction units being connected in a serial configuration, a parallel configuration, or a combination thereof.

30. A composition for removing sulfur from a gaseous or liquid mixture, said composition comprising:
a matrix comprising a lignocellulosic material enriched with iron, wherein said matrix is effective to remove sulfur from a gaseous or liquid mixture, and wherein said matrix has a pH of 4.5 or higher.

31. The composition according to claim 30, wherein said matrix comprises about 4 to about 40 percent iron on a dry weight basis.

32. The composition according to claim 30, wherein the lignocellulosic material is from a plant source.

33. The composition according to claim 30, wherein the lignocellulosic material is the product of composting.

34. The composition according to claim 30, wherein the lignocellulosic material is bark.

35. The composition according to claim 30, wherein the lignocellulosic material comprises indigestible components of plants that pass through ruminant animals and that are recovered from manures or manures plus bedding materials.

36. The composition according to claim 30, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 37. The composition according to claim 30, wherein said sulfur is in the form of one or more sulfur compounds selected from the group consisting of hydrogen sulfide, mercaptans, thiophenes, monosulfides, and disulfides.

38. A method for fertilizing land for agricultural use, said method comprising:
providing a composition for removing sulfur from a gaseous or liquid mixture, said composition comprising a matrix comprising a lignocellulosic material enriched with iron, wherein said matrix is effective to remove sulfur from a gaseous or liquid mixture;

contacting a gaseous or liquid mixture with the composition under conditions effective to remove sulfur from the mixture through adsorption of the sulfur to the matrix, thereby yielding a plant fertilizer comprising iron, sulfur, and lignocellulosic material; and applying the plant fertilizer to the land.

39. The method according to claim 38, wherein said matrix has a pH of 4.5 or higher.

40. The method according to claim 38, wherein said matrix comprises about 4 to about 40 percent iron on a dry weight basis.

41. The method according to claim 38, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 42. The method according to claim 38, wherein said sulfur is in the form of one or more sulfur compounds selected from the group consisting of hydrogen sulfide, mercaptans, thiophenes, monosulfides, and disulfides.

43. A method for preparing a plant fertilizer, said method comprising:

providing a composition for removing sulfur from a gaseous or liquid mixture, said composition comprising a matrix comprising a lignocellulosic material enriched with iron, wherein said matrix is effective to remove sulfur from a gaseous or liquid mixture; and contacting a gaseous or liquid mixture with the composition under conditions effective to remove sulfur from the mixture through adsorption of the sulfur to the matrix, thereby yielding a plant fertilizer comprising iron, sulfur, and lignocellulosic material.

44. The method according to claim 43, wherein said matrix has a pH of 4.5 or higher.

45. The method according to claim 43, wherein said matrix comprises about 4 to about 40 percent iron on a dry weight basis.

46. The method according to claim 43, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 47. The method according to claim 43, wherein said sulfur is in the form of one or more sulfur compounds selected from the group consisting of hydrogen sulfide, mercaptans, thiophenes, monosulfides, and disulfides.

48. A plant fertilizer prepared according to the method of claim 43.

49. A method for making a composition for use in removing sulfur from a gaseous or liquid mixture, said method comprising:

providing a lignocellulosic material; and combining iron with the lignocellulosic material under conditions effective to yield a matrix comprising a lignocellulosic material enriched with iron, wherein said matrix is effective to remove sulfur from a gaseous or liquid mixture, and wherein said matrix is adjusted to have a pH of 4.5 or higher.

50. The method according to claim 49, wherein said matrix comprises about 4 to about 40 percent iron on a dry weight basis.

51. The method according to claim 49, wherein the lignocellulosic material is from a plant source.

52. The method according to claim 49, wherein the lignocellulosic material is the product of composting.

53. The method according to claim 49, wherein the lignocellulosic material is bark.

54. The method according to claim 49, wherein the lignocellulosic material comprises indigestible components of plants that pass through ruminant animals and that are recovered from manures or manures plus bedding materials.

55. The method according to claim 49, wherein said iron is an alkaline iron selected from the group consisting of ferrous carbonate, ferrous bicarbonate, ferrous hydroxide, hydrated ferrous oxide, ferric carbonate, ferric bicarbonate, ferric hydroxide, ferric hydroxide oxide, hydrated ferric oxide, and mixtures thereof 56. The method according to claim 49, wherein said sulfur is in the form of one or more sulfur compounds selected from the group consisting of hydrogen sulfide, mercaptans, thiophenes, monosulfides, and disulfides.

\* \* \* \* \*